United States Patent Office.

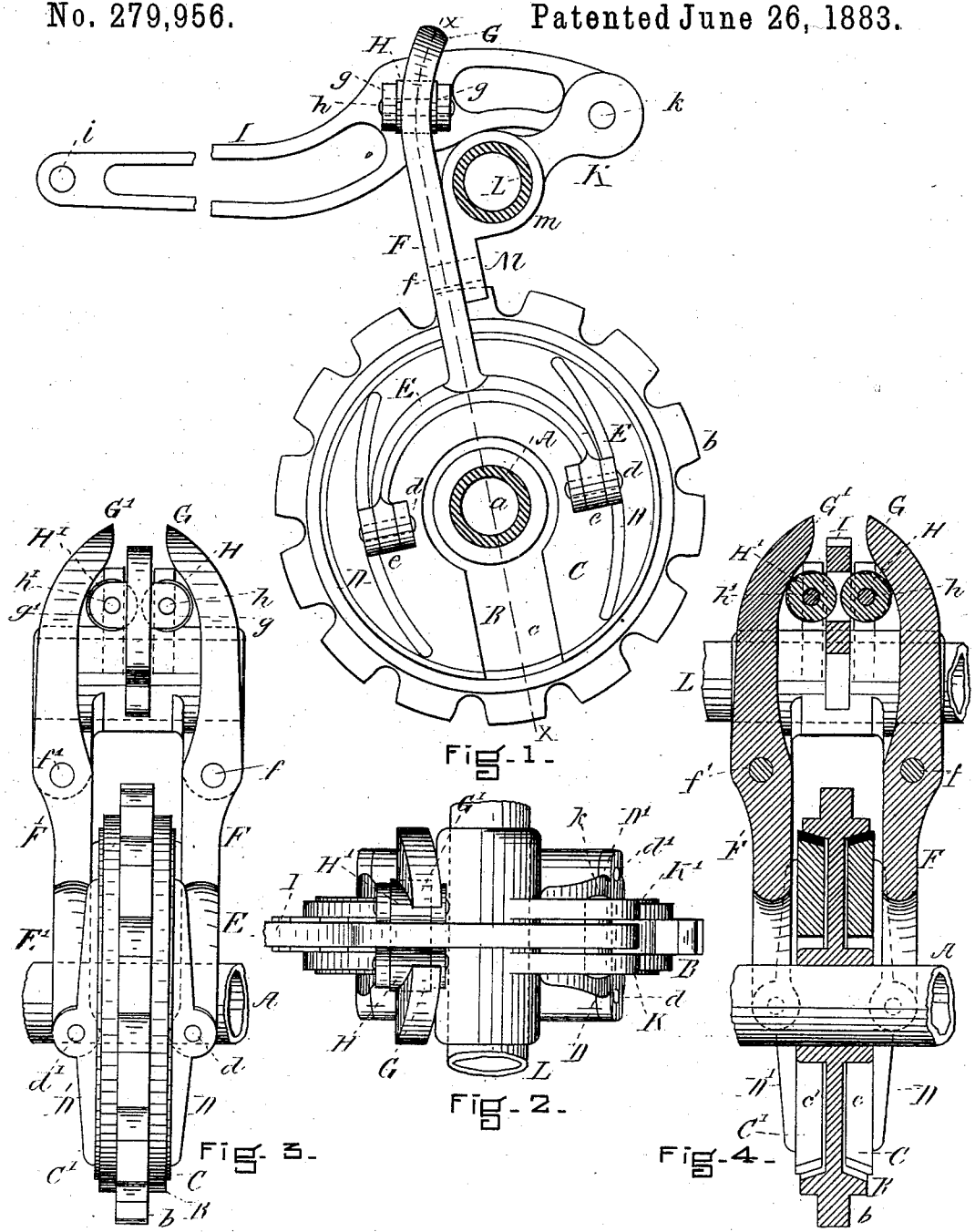

JOHN KNOUS, OF HARTFORD, CONNECTICUT, ASSIGNOR TO THE POPE MANUFACTURING COMPANY, OF BOSTON, MASSACHUSETTS.

BRAKE FOR VELOCIPEDES.

SPECIFICATION forming part of Letters Patent No. 279,956, dated June 26, 1883.

Application filed March 23, 1883. (No model.)

*To all whom it may concern:*

Be it known that I, JOHN KNOUS, of the city of Hartford, and State of Connecticut, have invented certain new and useful Improvements in Brakes for Velocipedes and other Vehicles, of which the following is a specification, and which are shown as applied in one form to a tricycle in the annexed drawings, in which—

Figure 1 shows in side elevation a brake mechanism embodying my improvements. Fig. 2 shows the same in top plan view. Fig. 3 shows the same in front elevation, and Fig. 4 shows the same in transverse section nearly on the line $x\ x$ in Fig. 1.

A is an axle or shaft of a tricycle having its wheels connected to revolve therewith.

B is a friction-disk, circular in form, on axle A, and in this contrivance shown forming part of a gear-wheel having a hub or bearing fixed on the axle A, and a row of teeth, $b$, on its circumference to engage with a driving-chain connecting it with a toothed wheel on a driving-shaft, the two sides of this friction-disk B being plane and parallel.

C C' are friction-plates, which, as here constructed, are nearly circular in form, having plane inner surfaces nearly fitting the plane surfaces of the friction-disk B, but having openings $c\ c'$ to allow for putting on and off over the axle A.

D D and D' D' are lugs or lug-bearing strengthening-ribs on the friction-plates C C'.

E E' are arms pivoted at $e\ e$ and $e'\ e'$ by small bolts $d\ d\ d'\ d'$, and connecting to and forming part of the plate-levers F F. The upper ends of these plate-levers F F are curved and formed like gradually-approaching jaws G G', as shown in Figs. 3 and 4, which jaws are also curved in a transverse direction, as shown in Fig. 1, so as to form a segment of a circle with its center at $k$.

H H' are anti-friction rollers, pivoted at $h\ h'$ to lugs $g\ g\ g'\ g'$ on the brake-lever I. Brake-lever I (shown broken in Fig. 1) may be used itself as a hand-lever with power applied at the free end, or to it may be pivoted, at $i$, a handle-rod, through which it may be operated. This brake-lever I has its fulcrum at the pivot $k$ in the lugs K K' on the sleeve $m$, which is fastened on a bar, L, forming a part of the frame of the tricycle above axle A.

M is a plate or lug, also connected to the sleeve $m$, or forming a projection thereto, to which are pivoted at $f\ f'$ the plate-levers F F'.

The operation of this contrivance is as follows: Whenever the tricycle is in motion, the driving wheel or wheels are revolving and the friction-disk B is revolving with them. To retard the motion of the tricycle, the operator lifts at the long free end of the brake-lever I, which forces the friction-rollers H H' upward, which spreads the jaws G G', which causes the lower ends of the arms E E and E' E' to approach, which forces the friction-plates C C' against the faces of the friction-disk B, checking its motion, and thereby tending to stop the revolution of the axle A, the wheel or wheels connected therewith, and the motion of the tricycle. Slight power applied to the brake-lever I causes friction between the plates C C' and the disk B, and any considerable power applied to the lever I or the handle connected with it stops the revolution of the disk B.

It is obvious from the foregoing description and the annexed drawings that the pivoting of the fork-arms E E' to the friction-plates C C' secures an evenly-distributed pressure over the operating-surfaces; also, that the conformation of the jaws G G' with reference to the friction-rollers H H' and the fulcrum $k$ of the brake-lever I, by which they are moved, is such as to cause less waste of power by friction to keep the rollers always on the operative parts of the jaws, and to make the leverage most effective. It is also obvious that the axle A may be hollow or solid and connected either immediately or mediately with the driving-wheels, and that the friction-disk B may be a separate plate from the gear-wheel, and may be attached to the hub of a driving-wheel, and that one friction-plate C only may be used, and that the plate C may be a complete disk, and that the form of the jaws may be varied so that they may be operated by a downward pressure instead of an upward pull on the lever, and that in various other ways the form of my contrivance may be modified or adapted to other vehicles or machines where there is a revolving wheel and shaft, and be checked by a brake, and without departing from the spirit of my invention.

When the brake is not in operation, the friction-plates C C' are separated a little, as shown in Fig. 4, so that their operative surfaces are not in contact with the surfaces of the disk B, and they may be held in this position of separation by their weight as suspended from pivots *f f'*, or by means of springs operating upon the plate-levers F F' or otherwise.

Heretofore brakes have been constructed with spoons or shoes bearing upon the periphery of driving-wheels, or with dogs engaging with the surface of the road, or with bands operating by friction on the periphery of drums attached to the axle or wheel of the vehicle.

The objects of my improvements have been to construct a brake at once more effective and certain in its operation, more durable and neater, and which in the application of it acts more directly and evenly upon the driving and supporting parts of the machine to which it is applied than is the case with any of the pre-existing mechanisms. I contemplate also using the levers F F', with their pivots and jaws G G' and the lever I, with its pivot and friction-rolls and attachments to frame L, to operate a band-brake on a drum instead of friction-plates.

Since filing my application for this patent I have become aware of Letters Patent numbered 263,083, issued to O. C. Wollson, 22d August, 1882, and the patent therein referred to of C. H. Gustin, numbered 48,810, dated July 18, 1865. I do not intend to claim as any part of my invention the devices or combinations therein shown and described, but limit myself to the essential modifications and improvements and the devices and combinations herein described and claimed, which are, I believe, new with me.

I claim as new and of my invention—

1. A friction-disk, B, combined with and forming part of a gear-wheel, with teeth *b*, adapted to be fixed on and revolve with a shaft, A, substantially as set forth.

2. The bracket-sleeve *m*, with lugs K and M, constructed and adapted to be combined substantially as set forth.

3. The plate-lever F, having jaw G, arms E E, constructed and adapted to be pivoted as at *f* and *e e*, and to be combined and operated substantially as set forth.

4. A friction-plate, C, having opening *c*, ribs or lugs D D, and constructed and adapted essentially as and for the purposes shown and described.

5. In a velocipede, the construction and combination of brake-lever I, plate-levers F F', and friction disks or plates B C C', with connections and attachments adapted for operation on a revolving shaft, and a frame connected therewith, essentially as set forth.

6. In a velocipede, the combination of brake-lever I, rolls H H', lugs *g g'*, pivots *h h', k, f f', d d*, and *d' d'*, bracket-sleeve *m*, lugs K M, D D, and D' D', plate-levers F F', arms E E E' E', plates C C', disk B, shaft A, and bar L, substantially as shown and described.

7. In a velocipede, the combination, with a brake, operating by the friction of surfaces, connected with one or more of the wheels and with the frame thereof, of pivoted levers F F', with jaws G G', and a hinged lever, I, all constructed and adapted to actuate the brake essentially as herein shown and described.

JNO. KNOUS.

Witnesses:
 WM. B. BROTHERTON,
 GEO. B. COBURN.